United States Patent
Oberhans et al.

(10) Patent No.: US 7,194,370 B2
(45) Date of Patent: Mar. 20, 2007

(54) METHOD FOR CORRECTING SCANNING SIGNALS OF INCREMENTAL POSITION TRANSDUCERS

(75) Inventors: Peter Oberhans, Tacherting (DE); Robert Wastlhuber, Garching (DE); Gabriele Ehgartner, Kienberg (DE)

(73) Assignee: Dr. Johannes Heidenhain GmbH, Traunreut (DE)

(*) Notice: Subject to any disclaimer, the term of this patent is extended or adjusted under 35 U.S.C. 154(b) by 0 days.

(21) Appl. No.: 10/668,481

(22) Filed: Sep. 22, 2003

(65) Prior Publication Data

US 2004/0058659 A1    Mar. 25, 2004

(30) Foreign Application Priority Data

Sep. 20, 2002  (DE)  ................. 102 44 848

(51) Int. Cl.
*H04B 1/60*  (2006.01)
(52) U.S. Cl. .................................. 702/106
(58) Field of Classification Search ............. 702/106, 702/162, 163, 94, 63, 72, 75; 700/2; 33/706, 33/707; 318/600; 345/7; 455/276; 358/1, 358/1.14, 473, 444, 531; 355/26; 369/97, 369/95; 710/48; 725/24; 370/366; 324/751, 324/601
See application file for complete search history.

(56) References Cited

U.S. PATENT DOCUMENTS 5,416,426 A * 5/1995 Okubo et al. ............... 324/751
5,956,659 A * 9/1999 Spies et al. .................. 702/94
6,249,359 B1 * 6/2001 Aoki et al. ................. 358/473
6,418,396 B2 * 7/2002 Hagl .......................... 702/150
2004/0051897 A1 * 3/2004 Kakiuchi et al. .......... 358/1.14

FOREIGN PATENT DOCUMENTS

DE        197 12 622      10/1998

OTHER PUBLICATIONS

Numerical control, Wikipedia encyclopedia [online], [retrieved on Jun. 12, 2006]. p. 1-3, Retrieved from the Internet <URL: http://en/wikipedia.org/wiki/Numerical_control>.*

* cited by examiner

*Primary Examiner*—Michael Nghiem
*Assistant Examiner*—Tung S. Lau
(74) *Attorney, Agent, or Firm*—Kenyon & Kenyon LLP

(57) ABSTRACT

In a device and a method for correcting scanning signals of incremental position transducers, which exhibit deviations from the signal shape required by a downstream evaluation unit, the scanning signals are fed to a correction unit in response to a signal request and, to implement the correction, are linked there to correction data which were generated in consideration of active values of the scanning signals. Following each signal request, for at least one predefined time segment, the correction unit is exclusively fed scanning signals which are used for generating correction data.

13 Claims, 2 Drawing Sheets

METHOD FOR CORRECTING SCANNING SIGNALS OF INCREMENTAL POSITION TRANSDUCERS

CROSS-REFERENCE TO RELATED APPLICATIONS

The present application claims priority to Application No. 102 44 848.5, filed in the Federal Republic of Germany on Sep. 20, 2002, which is expressly incorporated herein in its entirety by reference thereto.

FIELD OF THE INVENTION

The present invention relates to a method for correcting scanning signals of incremental position transducers and a device therefor.

BACKGROUND INFORMATION

When an incremental position transducer is used for measuring positions, a periodic scale structure is scanned by a scanning unit provided for that purpose, to produce, on the output side, at least two periodic analog scanning signals, which are out-of-phase with each other. These signals are used for determining the relative position of the scale and the scanning unit in a downstream evaluation unit. In this manner, it is possible to record the relative position of two components which are movable relatively to one another, one of which is coupled to the scale and the other to the scanning unit, for example the relative position of two machine parts of a machine tool that are movable relatively to one another. In this case, a numerical control of a machine tool is used as an evaluation unit.

The accuracy of the positional determination using a position transducer of this kind is dependent, in particular, on the quality of the generated periodic scanning signals. In this connection, in dependence upon the physical measuring principle underlying the particular position transducer, various error sources are significant. In optical measuring systems, inaccuracies in the reflective or transmittive graduation structures of the scale can degrade the signal quality. With respect to other physical measuring principles, in particular magnetic position transducers, variations in the scanning distance or in the temperature can influence the measuring results.

Errors of this kind may have a disadvantageous effect, particularly when the scanning signals undergo a subsequent interpolation where the aim is to further electronically subdivide the analog scanning signals. It is, after all, a prerequisite for the interpolation to have an ideal form of the analog scanning signals, as well as an ideal relation between these (e.g., a precisely defined phase shift, as well as constant amplitude values). Interfering errors are considered, above all, to include different amplitude values of the two out-of-phase scanning signals, a phase shift that deviates from the predefined ideal phase shift, as well as a direct-voltage offset of the two periodic scanning signals.

To correct such deviations in the scanning signals from the ideal signal shape, it is conventional to link the scanning signals in a correction unit to correction parameters which convert the faulty scanning signals into ideal scanning signals (compare German Published Patent Application No. 197 12 622). To this end, for every signal query of the evaluation unit, correction data must be made available which are linked to the scanning signals to implement the planned correction. For this, correction data are converted into actuating signals which effect the appropriate correction of the scanning signals. Here, the signal request (or fetch operation), in which the evaluation unit requests new scanning signals (measured values of the position transducer system), triggers, in each instance, the generation of the correction data for evaluation. This takes place in dependence upon active values of the scanning signals. The signal requests can follow on the basis of defined query grids, as described, for example, in German Published Patent Application No. 197 12 622. The generation of correction data is subordinate to the evaluation unit's request for new scanning signals to be corrected and is tied to corresponding cycle times of the signal requests.

It is an object of the present invention to provide a method and a device for correcting the scanning signals of incremental position transducers that may be further improved with respect to generating correction data for the scanning signals.

SUMMARY

The above and other beneficial objects of the present invention may be achieved by providing a method and device as described herein.

According to an example embodiment of the present invention, following each signal request in which the evaluation unit requests scanning signals to be corrected from the position transducer system, for at least one predefined time segment, the correction unit is exclusively fed scanning signals which are used to generate new correction data.

Thus, following each signal request (request of new measured values from the position transducer system), a specific time window (corresponding to a latency period) is reserved, during which the correction unit is available exclusively for the (internally triggered) acquisition of new scanning signals, the goal being to generate new correction data, not, however, for the (internally or externally triggered) supplying of new scanning signals to be corrected and evaluated.

The foregoing may ensure that, in the correction unit, the correction data necessary for correcting the scanning signals to be evaluated may always be able to be generated from active scanning signals and be available for implementing the correction. This may be achieved, in particular, in that, during the time segment in question, no new scanning signals to be corrected are able to be fed to the correction unit, thus, it may be impossible for such scanning signals to be fed to the correction unit during this time segment (signal supply is blocked).

To this end, it may be provided for all signal requests to be checked by a logic device to determine whether they apply to scanning signals which are to undergo a correction in the correction unit, or to scanning signals used for generating correction data, during the predefined time segment, no signal requests being carried out which apply to scanning signals to be corrected in the correction unit.

The appropriate time segment may be to be selected so that, on the one hand, it permits the acquisition of scanning signals necessary for generating the correction data and that, on the other hand, it is shorter than the difference in time between successive signal requests, which is defined by the query grid (i.e., a query clock-pulse rate) preset by the evaluation unit.

The scanning signals generated by the position transducer system may be analog signals which are digitized by an analog/digital converter before the correction is performed. In customary incremental measuring systems, following each signal request, two scanning signals having a 90° phase shift (following the requisite correction) are evaluated. When using so-called interferential, three-grid measuring systems, however, three scanning signals having an ideal phase shift of 120° may also exist.

In this context, the (digital) correction data are generated in each instance as a function of the active values of the scanning signals using a microprocessor or a hardwired logic circuit, which may constitute a part of the correction unit. To implement the correction, suitable correction algorithms are stored, for example, in a main memory assigned to the microprocessor.

In an example embodiment of the present invention, a method for correcting scanning signals of an incremental position transducer having deviations from ideal signals for a downstream evaluation unit includes feeding the scanning signals to a correction unit in response to a signal request, linking the scanning signals in the correction unit to correction data generated in accordance with active values of the scanning signals, and exclusively feeding scanning signals for generating correction data to the correction unit for at least one predefined time segment following each request of new scanning signals to be corrected.

In an example embodiment of the present invention, a device for correcting scanning signals of an incremental position transducer having deviations from ideal signals for a downstream evaluation unit includes an arrangement configured to perform a method, which includes the steps of feeding the scanning signals to a correction unit in response to a signal request, linking the scanning signals in the correction unit to correction data generated in accordance with active values of the scanning signals, and exclusively feeding scanning signals for generating data to the correction unit for at least one predefined time segment following each request of new scanning signals to be corrected.

In an example embodiment of the present invention, a device for correcting scanning signals of an incremental position transducer having deviations from ideal signals for a downstream evaluation unit includes means for feeding the scanning signals to a correction unit in response to a signal request, means for linking the scanning signals in the correction unit to correction data generated in accordance with active values of the scanning signals, and means for exclusively feeding scanning signals for generating data to the correction unit for at least one predefined time segment following each request of new scanning signals to be corrected.

Other features and aspects of the present invention are set forth below in the following description and attached FIGS. of an example embodiment of the present invention.

DETAILED DESCRIPTION

Figure 1:
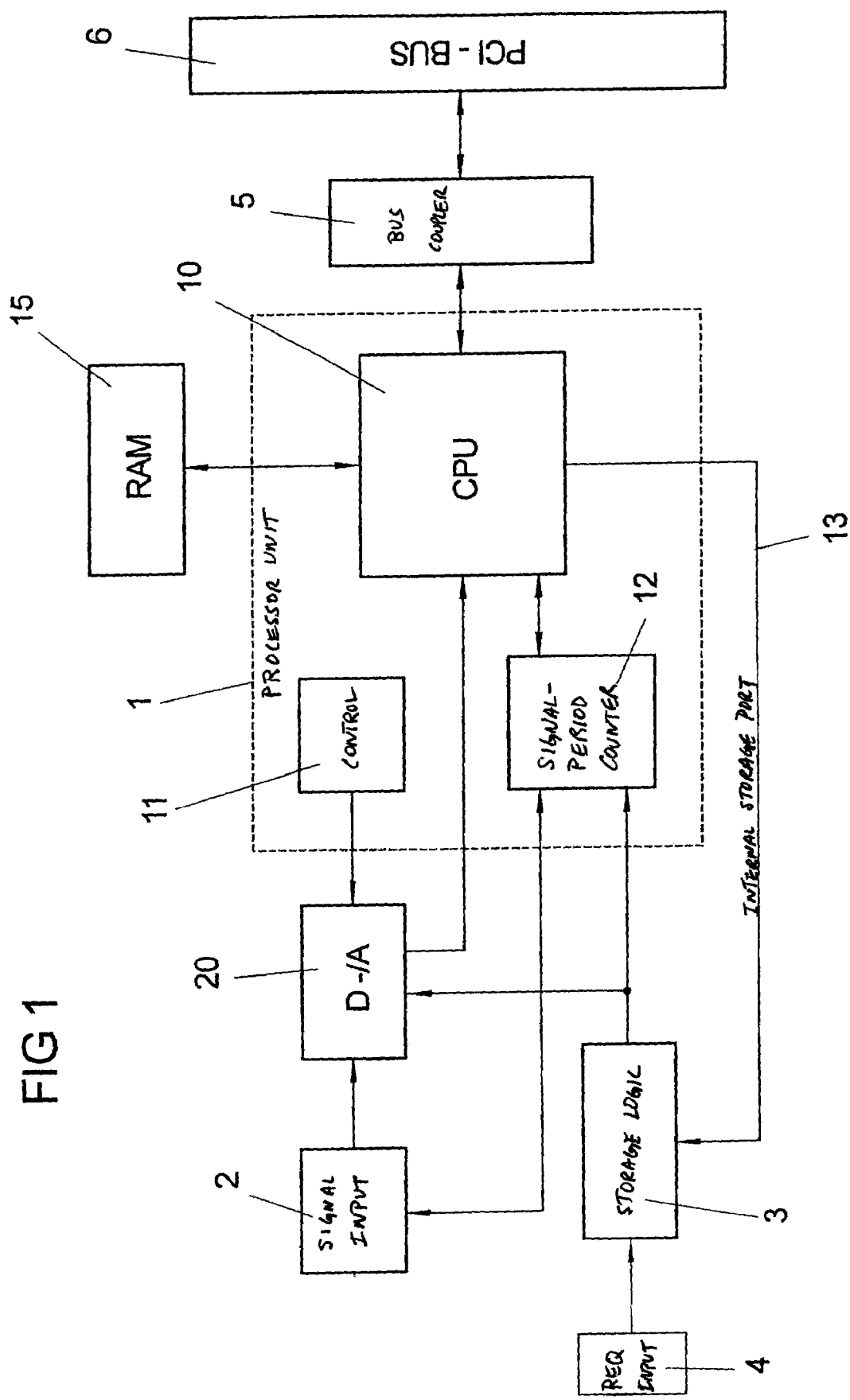
FIG. 1 schematically illustrates a system for correcting scanning signals of a position transducer system as a block diagram.

FIG. 1 schematically illustrates a system for processing, in particular, correcting analog incremental signals generated by a position transducer system. Here, it may concern, for example, a counter card which is insertable into a corresponding slot of the computer for purposes of evaluating measured values of a position transducer system.

The system includes a processor unit 1, which, via an assigned signal input 2, is able to be fed scanning signals from a position transducer in the form of sinusoidal current or voltage signals. These scanning signals may be generated, in particular, by two sinusoidal current or voltage signals of the position transducer that are 90° out-of-phase with each other. Signal input 2 is connected to a microprocessor 10 of processor unit 1 via an analog/digital converter 20, which is controlled by a control 11 provided in processor unit 1.

In addition, processor unit 1 includes a signal-period counter 12, which, one the one hand, is connected in outgoing circuit to signal input 2 and, on the other hand, is connected to microprocessor 10, as well as to a main memory 15 assigned to microprocessor 10.

Also connected in outgoing circuit to microprocessor 10 is an internal storage port 13 via which microprocessor 10 is connected on the output side to a storage logic 3. Storage logic is additionally connected on the input side to an (optional) request input 4 for the external request of new measured values (scanning signals) of the position transducer and is connected on the output side both (via analog/digital converter 20) to microprocessor 10, as well as to signal-period counter 12 of processor unit 1.

Connected in outgoing circuit to processor unit 1 are a bus coupler 5 and a bus 6, via which the signals processed in processor unit 1 are able to be fed to an evaluation unit, in this case a computer, which may also include some other numerical control or motor control.

Using the system illustrated in FIG. 1, the method according to an example embodiment of the present invention for processing the scanning signals of incremental position transducer systems is able to be implemented in that, in response to a signal request that is classified and routed by storage logic 3, and is either triggered externally via request input 4 or internally via storage port 13 by programming processor unit 1 accordingly, by signal input 2 provided for this purpose, new analog scanning signals (measured values of the position transducer) in the form of analog current or voltage signals, which are out-of-phase with each other, are fed to analog-digital converter 20 and are digitized there. These digitized scanning signals are corrected in microprocessor 10 of processor unit 1, deviations from the predefined phase offset of the scanning signals (for example 90°), deviations in the amplitude of the phase signals, as well as a possible signal offset being compensated to generate corrected, ideal scanning signals, in particular. By doing so, it is also possible to eliminate unwanted harmonic components of the input signals (caused by time-controlled triggering) which resulted in errors in the subsequent signal processing in the evaluation unit. For that reason, processor unit 1 is used, in particular, as a correction unit. The corrected scanning signals are subsequently interpolated in microprocessor 10. The algorithms required for implementing the interpolation as well as the correction are stored in main memory 15.

Moreover, the analog scanning signals are evaluated by signal-period counter 12 of processor unit 1, which is coupled on the output side to microprocessor 10. From the count of the signal periods, as well as the correction and interpolation of the scanning signals, the corrected measured values are derived which are fed in serial form via bus 6 for further evaluation to the evaluation unit (computer).

In accordance with an example embodiment of the present invention, in the case at hand, following each signal request, i.e., following each storage pulse, which causes new scanning signals to be corrected to be fed to processor unit 1, a latency period is reserved in which no new scanning signals to be corrected are fed to processor unit 1, rather, exclusively scanning signals are acquired by processor unit 1 which are used for generating correction data, to which the scanning signals generated by the position transducer system may be linked using suitable correction algorithms for producing ideal scanning signals. The generation of correction data of this kind and the manner in which they are linked to scanning signals may be conventional, so that there is no need to describe this in greater detail here. Instead, reference is made, for example, to German Published Patent Application No. 197 12 622, as well as to the further patents and printed publications described therein, each of which are expressly incorporated herein in its entirety by reference thereto.

The request of scanning signals used for generating correction data is carried out during the latency period via internal storage port 13 and storage logic 3. The latter selects all signal requests to determine whether they should effect the supplying of scanning signals to be corrected or the supplying of scanning signals, used for generating correction data, to processor unit 1. The first are not permitted during the latency period, thus, in particular, no signal requests applied externally via request input 4 are permitted. Rather, only those signal requests which arrive via internal storage port 13 to storage logic 3 and are used for generating new correction data, are to be routed (retransmitted) for execution.

Figure 2:
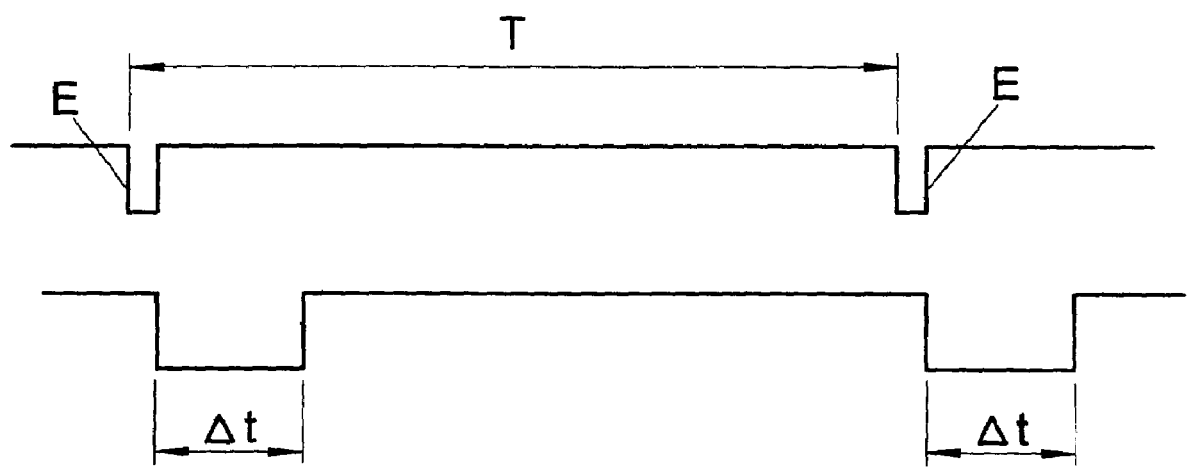
FIG. 2 illustrates the time relation of signal requests and latency periods.

FIG. 2 schematically illustrates a sequence of external signal requests in the form of storage pulses E, which occur in each instance at a constant time interval T of, for example, 100 ms (in accordance with a defined query grid) and the supplying of new scanning signals to be corrected, to processor unit 1 (for the duration of the particular storage pulse E). Each of these storage pulses E is assigned a time window (latency period) $\Delta t$ of, for example, 15 to 20 µs, in which processor unit 1 does not supply any new scanning signals of position transducer system to be initially corrected and then evaluated, rather exclusively scanning signals used for generating correction data. This means that during time window $\Delta t$ following the particular storage pulse E in question, no additional signal requests may be effected via storage port 3 that may result in the supplying of additional scanning signals to be corrected and subsequently evaluated, to processor unit 1.

In practice, the beginning of the particular time window $\Delta t$ may also coincide with the first trailing edge of the particular storage pulse E, since the duration of the measured value acquisition (duration of the acquisition of active scanning signals of the position transducer system to be corrected and evaluated, inclusive of their supplying to microprocessor 10) is known and, as a rule, is equal to the duration of the particular storage pulse E. Time window $\Delta t$ is then to be selected in such a way that, following the measured value acquisition, sufficient time is available for acquiring such scanning signals which are used for generating new correction data. During this second segment of time window $\Delta t$, no scanning signals are then acquired that need to be corrected for later evaluation in a sequential electronics, etc. Decisive may be thus solely that, following a measured-value request in the form of a storage pulse E, (in some manner) a sufficiently long time segment is made available in which exclusively those scanning signals are acquired and fed to the microprocessor which are used for generating correction data.

What is claimed is:

1. A method for correcting position dependent scanning signals of an incremental position transducer for measuring positions, the position dependent scanning signals having deviations from ideal signals expected by a downstream evaluation unit, comprising:
   feeding the position dependent scanning signals of the incremental position transducer to a correction unit in response to a signal request, the incremental position transducer including a periodic scale structure scanned by a scanning unit;
   linking the position dependent scanning signals in the correction unit to correction data generated in accordance with active values of the scanning signals; and
   exclusively feeding scanning signals for generating correction data to the correction unit for at least one predefined time segment of finite length following each request of new scanning signals to be corrected,
   wherein no new scanning signals are supplied to be corrected during the at least one predefined time segment.

2. The method according to claim 1, further comprising digitizing analog signals of the scanning signals before the step of feeding the scanning signals to the correction unit.

3. The method according to claim 1, wherein the step of feeding the scanning signals to the correction unit includes feeding at least two scanning signals to be corrected to the correction unit in response to request of scanning signals to be corrected, the two scanning signals being out-of-phase with each other.

4. The method according to claim 1, further comprising triggering the signal request by at least one of a microprocessor of the correction unit and an external pulse.

5. The method according to claim 1, further comprising generating the correction data as a function of active values of the scanning signals in a microprocessor.

6. The method according to claim 1, further comprising correcting the scanning signals in accordance with at least one predefined correction algorithm.

7. A method for correcting scanning signals of an incremental position transducer having deviations from ideal signals expected by a downstream evaluation unit, comprising:
   feeding the scanning signals to a correction unit in response to a signal request;
   linking the scanning signals in the correction unit to correction data generated in accordance with active values of the scanning signals;
   exclusively feeding scanning signals for generating correction data to the correction unit for at least one predefined time segment of finite length following each request of new scanning signals to be corrected; and
   checking the signal request by a logic device to determine whether the signal request applies to scanning signals that are to undergo a correction in the correction unit or to scanning signals for generating correction data, wherein no new scanning signals are supplied to be corrected during the at least one predefined time segment.

8. The method according to claim 7, further comprising performing no signal requests for a predetermined time segment that apply to scanning signals to be corrected in the correction unit.

9. A method for correcting scanning signals of an incremental position transducer having deviations from ideal signals expected by a downstream evaluation unit, comprising:
   feeding the scanning signals to a correction unit in response to a signal request;

linking the scanning signals in the correction unit to correction data generated in accordance with active values of the scanning signals; and exclusively feeding scanning signals for generating correction data to the correction unit for at least one predefined time segment following each request of new scanning signals to be corrected;

wherein the predefined time segment is shorter than a shortest difference in time between two signal requests of new scanning signals to be corrected, and wherein no new scanning signals are supplied to be corrected during the at least one predefined time segment.

10. A method for correcting scanning signals of an incremental position transducer having deviations from ideal signals expected by a downstream evaluation unit, comprising:

feeding the scanning signals to a correction unit in response to a signal request;

linking the scanning signals in the correction unit to correction data generated in accordance with active values of the scanning signals; and exclusively feeding scanning signals for generating correction data to the correction unit for at least one predefined time segment following each request of new scanning signals to be corrected;

wherein the signal requests of scanning signals to be corrected occur in constant time intervals, the predefined time segment shorter than the constant time intervals, and wherein no new scanning signals are supplied to be corrected during the at least one predefined time segment.

11. A device for correcting position dependent scanning signals of an incremental position transducer for measuring positions, the position dependent scanning signals having deviations from ideal signals expected by a downstream evaluation unit, comprising:

an arrangement configured to perform a method including the steps of:

feeding the position dependent scanning signals of the incremental position transducer to a correction unit in response to a signal request, the incremental position transducer including a periodic scale structure scanned by a scanning unit;

linking the position dependent scanning signals in the correction unit to correction data generated in accordance with active values of the scanning signals; and exclusively feeding scanning signals for generating data to the correction unit for at least one predefined time segment of finite length following each request of new scanning signals to be corrected, wherein no new scanning signals are supplied to be corrected during the at least one predefined time segment.

12. A device for correcting position dependent scanning signals of an incremental position transducer for measuring positions, the position dependent scanning signals having deviations from ideal signals expected by a downstream evaluation unit, comprising:

means for feeding the position dependent scanning signals of the incremental position transducer to a correction unit in response to a signal request, the incremental position transducer including a periodic scale structure scanned by a scanning unit;

means for linking the position dependent scanning signals in the correction unit to correction data generated in accordance with active values of the scanning signals; and means for exclusively feeding scanning signals for generating data to the correction unit for at least one predefined time segment of finite length following each request of new scanning signals to be corrected, wherein no new scanning signals are supplied to be corrected during the at least one predefined time segment.

13. A method for correcting position dependent scanning signals of an incremental position transducer for measuring positions, the position dependent scanning signals having deviations from ideal signals expected by a downstream evaluation unit, comprising:

feeding the position dependent scanning signals of the incremental position transducer to a correction unit in response to a signal request, the incremental position transducer including a periodic scale structure scanned by a scanning unit;

linking the position dependent scanning signals in the correction unit to correction data generated in accordance with active values of the scanning signals; and for each request of new scanning signals to be corrected, reserving a predefined time segment of finite length, during which the correction unit is available exclusively for an acquisition of new scanning signals in order to generate new correction data.

* * * * *